United States Patent
Nadeem (10) Patent No.: US 11,881,997 B1
(45) Date of Patent: Jan. 23, 2024

(54) DETERMINING REORDER COMMANDS FOR REMOTE REORDERING OF POLICY RULES

(71) Applicant: Juniper Networks, Inc., Sunnyvale, CA (US)

(72) Inventor: Fnu Nadeem, Fremont, CA (US)

(73) Assignee: Juniper Networks, Inc., Sunnyvale, CA (US)

( * ) Notice: Subject to any disclaimer, the term of this patent is extended or adjusted under 35 U.S.C. 154(b) by 65 days.

(21) Appl. No.: 17/305,625

(22) Filed: Jul. 12, 2021

(51) Int. Cl.
*H04L 41/0893* (2022.01)
*H04L 41/08* (2022.01)
*H04L 41/0816* (2022.01)

(52) U.S. Cl.
CPC ...... *H04L 41/0893* (2013.01); *H04L 41/0816* (2013.01); *H04L 41/0886* (2013.01)

(58) Field of Classification Search
CPC ............. H04L 41/0893; H04L 41/0816; H04L 41/0886
See application file for complete search history.

(56) References Cited

U.S. PATENT DOCUMENTS

| 7,062,546 | B1 | 6/2006 | Kolar et al. | |
| 8,156,213 | B1 | 4/2012 | Deng et al. | |
| 8,429,255 | B1 * | 4/2013 | Khan | H04L 47/10 |
| | | | | 709/221 |

OTHER PUBLICATIONS

Bespamyatnikh et al. "Enumerating longest increasing subsequences and patience sorting" Information Processing Letters 76(1-2):7-11, Nov. 2000, 10 pp.

(Continued)

*Primary Examiner* — David R Lazaro
*Assistant Examiner* — Zia Khurshid
(74) *Attorney, Agent, or Firm* — Shumaker & Sieffert, P.A.

(57) ABSTRACT

In general, techniques are described for determining reorder commands for remote reordering of policy rules. A device management system comprising a memory, a processor, and an interface may be configured to perform the techniques. A memory may store a currently configured policy for a managed network device and an updated policy for the managed device. The processor may determine a longest increasing subsequence (LIS) between a source list comprising the plurality of policy rules in a first ordering and a destination list of the plurality of policy rules in a second ordering. The processor may generate, based on the LIS, one or more policy configuration commands for the managed network device that direct the managed network device to conform the currently configured policy to the updated policy. The interface may output the one or more policy configuration commands to the managed network device.

20 Claims, 6 Drawing Sheets

(56) References Cited

OTHER PUBLICATIONS

Kartit et al. "Improvement of Algorithm for Updating Firewall Policies" Journal of Theoretical and Applied Information Technology, vol. 66, No. 1, Aug. 10, 2014, 6 pp.

Zhang et al. "On the Safety and Efficiency of Firewall Policy Deployment" IEEE Symposium on Security and Privacy, Jun. 2007, 15 pp.

"Juniper Networks Network and Security Manager Administration Guide Revision 2009.1," Juniper Networks, Inc., Aug. 2009, available at http://www.juniper.net/techpubs/software/management/security-manager/nsm2009_1/nsm-admin-guide.pdf, 1008 pp.

"Junos Space Security Director" Juniper Networks, Inc., Jun. 2021, available at https://www.juniper.net/us/en/products/security/security-director-network-security-management.html, 5 pp.

* cited by examiner

DETERMINING REORDER COMMANDS FOR REMOTE REORDERING OF POLICY RULES

TECHNICAL FIELD

The techniques relate to computer networks, and, more particularly, to configuring policies of network devices.

BACKGROUND

A packet-based computer network is a group of network devices, such as routers, switches, endpoint devices, and servers, which are interconnected in such a manner as to permit the exchange of network packets between any two or more of the network devices. Network devices typically include a mechanism, referred to herein as a management interface, for directly or remotely configuring the network devices. By interacting with the management interface, a device management system can configure a network device with a policy having a number of policy rules that each specify an action for the device to perform on the occurrence of some condition. For example, a security policy rule may cause a network device to drop packets that match certain criteria specified by the rule, such as packets received from a particular source. In many instances, a policy may define a number of different rules, where each of the rules specifies certain matching criteria and one or more actions to take in the event the criteria is met. The network device applies the rules in accordance with a defined ordering specified by the policy. In many instances, the ordering of the policy rules within a policy affects the operation and performance of a network device that applies the policy.

SUMMARY

In general, techniques are described for reducing the number of commands needed to reorder an ordered list of policy rules for a network device to an updated ordering in an equivalently or possibly less computationally complex manner but in a more space efficient manner compared to existing ways by which such commands are determined (e.g., using a longest common subsequence—LCS).

A device management system may be configured to perform various aspects of the techniques to reorder policy rules within policies, which may include security, routing, filtering and QoS policies, network address translation (NAT) policies, access control policies, and other configuration data. The device management system may enable an administrator to insert additional rules, delete rules, and modify the execution order of the rules in the current ordered policy to increase robustness or efficiency or to otherwise better enable a network device under management (which may also be referred to as a "managed network device") to carry out various network objectives. The administrator assembles the desired policy configuration for the device to produce an updated list of policy rules and directs the device management system to update the network device to conform the device configuration to the updated policy.

To reorder policy rules from a current version of a policy ("current policy") to obtain an updated version of a policy ("updated policy"), the device management system determines a longest increasing subsequence (LIS) of policy rules shared by the current policy and the updated policy, where the LIS is indicative of the longest subset of policy rules that have the same ordering (not necessarily contiguous) in both the current policy and the updated policy. The device management system establishes the LIS as a pivotal sequence and generates reordering commands that, when sent to the network device, cause the network device to move individual policy rules in the current policy to a new position relative to the LIS, thereby conforming the device configuration to the updated policy.

The techniques described in this disclosure may provide one or more advantages. For example, because many network devices often include hundreds or even thousands of policy rules, even minor changes in a policy configuration can require numerous reorder commands that consume significant network and device resources when the updates are performed by an inefficient configuration update process. In some situations, a large amount of reorder commands can even cause a device to crash or otherwise be rendered inoperable for a time. Using the techniques described herein may reduce a number of reorder commands needed and may therefore reduce the amount of network resources needed to reconfigure a device. Moreover, compared to alternative ways by which the device management system may compute the reorder commands (such as by way of determining a longest common subsequence—LCS), using LIS may reduce computational and/or space complexity, resulting in a more efficient operation of device management systems (in terms of number of processor cycles expended, memory space consumed, and/or memory bus bandwidth utilization).

The techniques described may provide one or more advantages. For example, because many network devices often include hundreds or even thousands of policy rules, even minor changes in a policy configuration can require numerous reorder commands that consume significant network and device resources when the updates are performed by an inefficient configuration update process. In some situations, a large amount of reorder commands can even cause a device to crash or otherwise be rendered inoperable for a time. Using the techniques described herein may reduce a number of reorder commands needed and may therefore reduce the amount of network resources needed to reconfigure a device. Moreover, compared to alternative ways by which the device management system may compute the reorder commands (such as by way of determining a longest common subsequence—LCS), using LIS may reduce computational and/or space complexity, resulting in a more efficient (in terms of number of processor cycles expended, memory space consumed, and/or memory bus bandwidth utilization) operation of device management systems.

In one aspect, various aspects of the techniques are directed to a network management device comprising: a memory configured to store a currently configured policy for a managed network device and an updated policy for the managed device, wherein the currently configured policy comprises a plurality of policy rules in a first ordering, and the updated policy comprises the plurality of policy rules in a second ordering, one or more processors configured to: determine a longest increasing subsequence between a source list comprising the plurality of policy rules in the first ordering and a destination list of the plurality of policy rules in the second ordering, wherein the longest increasing subsequence is indicative of a longest subset of the plurality of policy rules that have a same ordering in both the source list and the destination list; and generate, based on the longest increasing subsequence, one or more policy configuration commands for the managed network device that direct the managed network device to conform the currently configured policy to the updated policy; and an interface configured to output the one or more policy configuration commands to the managed network device.

In another aspect, various aspects of the techniques are directed to a method comprising: storing a currently configured policy for a managed network device and an updated policy for the managed device, wherein the currently configured policy comprises a plurality of policy rules in a first ordering, and the updated policy comprises the plurality of policy rules in a second ordering; determining a longest increasing subsequence between a source list comprising the plurality of policy rules in the first ordering and a destination list of the plurality of policy rules in the second ordering, wherein the longest increasing subsequence is indicative of a longest subset of the plurality of policy rules that have a same ordering in both the source list and the destination list; and generating, based on the longest increasing subsequence, one or more policy configuration commands for the managed network device that direct the managed network device to conform the currently configured policy to the updated policy; and outputting the one or more policy configuration commands to the managed network device.

In another aspect, various aspects of the techniques are directed to a non-transitory computer-readable storage medium having instructions stored thereon that, when executed, cause one or more processors to: store a currently configured policy for a managed network device and an updated policy for the managed device, wherein the currently configured policy comprises a plurality of policy rules in a first ordering, and the updated policy comprises the plurality of policy rules in a second ordering; determine a longest increasing subsequence between a source list comprising the plurality of policy rules in the first ordering and a destination list of the plurality of policy rules in the second ordering, wherein the longest increasing subsequence is indicative of a longest subset of the plurality of policy rules that have a same ordering in both the source list and the destination list; generate, based on the longest increasing subsequence, one or more policy configuration commands for the managed network device that direct the managed network device to conform the currently configured policy to the updated policy; and output the one or more policy configuration commands to the managed network device.

The details of one or more aspects of the techniques are set forth in the accompanying drawings and the description below. Other features, objects, and advantages of the techniques will be apparent from the description and drawings, and from the claims.

DETAILED DESCRIPTION

Figure 1:
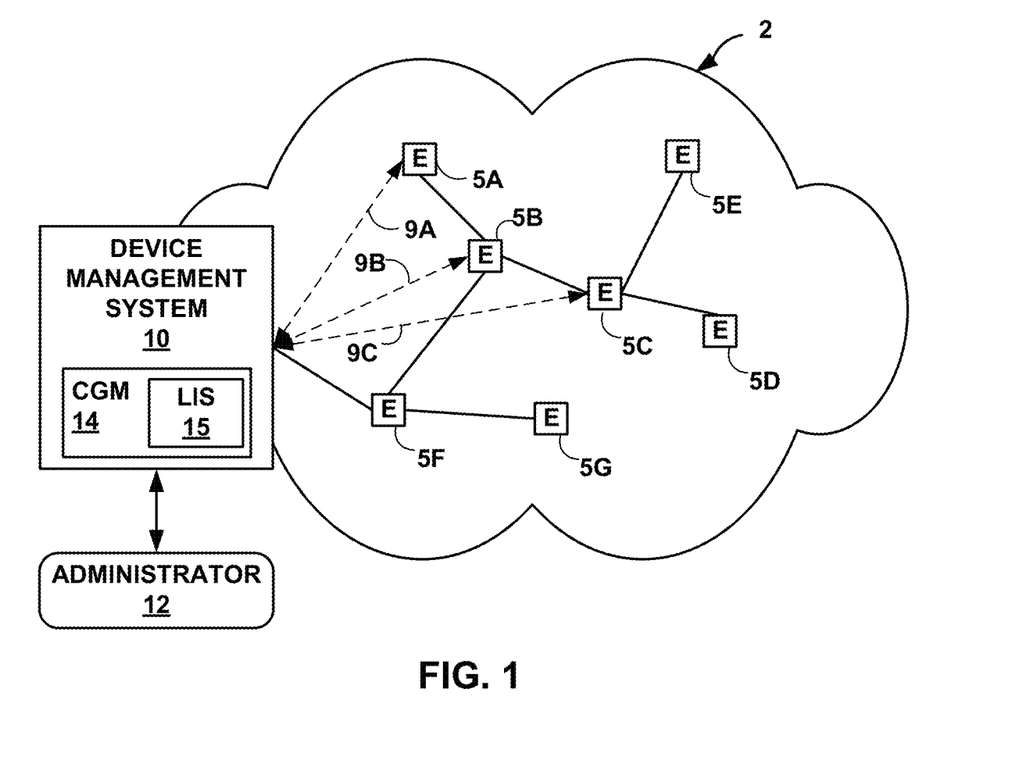
FIG. 1 is a block diagram illustrating enterprise elements managed with a device management system according to the techniques described.

FIG. 1 is a block diagram illustrating elements of an enterprise network 2 that are managed using a device management system 10. Managed elements 5A-5G (collectively, "elements 5") of enterprise network 2 are existing network devices interconnected via communication links to form a communication topology in order to exchange resources and information. Elements 5 may include, for example, routers, switches, gateways, bridges, hubs, servers, firewalls or other intrusion detection systems (IDS) or intrusion prevention systems (IDP), computing devices, computing terminals, printers, other network devices, or a combination of such devices. While described in this disclosure as transmitting, conveying, or otherwise supporting packets, enterprise network 2 may transmit data according to any other discrete data unit defined by any other protocol, such as a cell defined by the Asynchronous Transfer Mode (ATM) protocol, or a datagram defined by the User Datagram Protocol (UDP). Communication links interconnecting elements 5 may be physical links (e.g., optical, copper, and the like) or wireless. Enterprise network 2 may be coupled to one or more additional private or public networks, e.g., the Internet (not shown).

Device management system 10 is communicatively coupled to elements 5 via enterprise network 2. Device management system 10 may be coupled either directly or indirectly connected to the various elements 5. Once elements 5 are deployed and activated, administrator 12 may use device management system 10 to manage the network devices using a device management protocol. In general, device management system 10 uses a network management protocol designed for management of configuration data within managed network elements 5, such as the Simple Network Management Protocol (SNMP) protocol or the Network Configuration Protocol (NETCONF) protocol or a derivative thereof, such as the Juniper Device Management Interface, to perform the configuration. Using the network management protocol, device management system 10 may establish configuration sessions with one or more of elements 5 that allows device management system 10 to traverse and modify configuration data within each of managed elements 5. In the example of FIG. 1, device management system 10 is illustrated as participating in configuration sessions 9A-9C ("configuration sessions 9") with elements 5A-5C, respectively.

In common practice, device management system 10 and elements 5 managed by device management system 10 are centrally maintained by an IT group of the enterprise and are collectively referred to as an element management system (EMS) or a network management system (NMS). Administrator 12 interacts with device management system 10 to remotely monitor and configure elements 5. For example, administrator 12 may receive alerts from device management system 10 regarding any of elements 5, view configuration data of elements 5, modify the configurations data of elements 5, add new network devices to enterprise network 2, remove existing network devices from enterprise network 2, or otherwise manipulate the enterprise network 2 and network devices therein. Although described with respect to an enterprise network, the techniques of this invention are applicable to other network types, public and private, including LANs, VLANs, VPNs, and the like.

Administrator 12 uses device management system 10 to configure elements 5 with policy rules that specify certain operational characteristics that further the objectives of administrator 12. For example, administrator 12 may, using policy rules, specify for an element 5 a particular operational policy regarding security, device accessibility, traffic engineering, quality of service (QoS), network address translation (NAT), packet filtering, packet forwarding, rate limiting, or other policies. While described with respect to policy rules, the techniques of this disclosure may be applicable to other aspects of network devices, including modifying routing tables, or other aspects involving updating an ordered list of entries.

Managed network elements 5 maintain data for a particular policy (e.g., security) as an ordered list of policy rules that are each keyed to a unique identifier. Upon occurrence of a triggering event in one of managed network element 5, such as the receipt of a packet, the element sequentially traverses the ordered list to determine the first policy rule in the list that applies to the triggering event data. If the element finds an applicable policy rule, the element proceeds to execute the specified action (e.g., drop the packet, update a traffic log, or redirect the packet for further analysis and inspection).

Device management system 10 provides an interface that administrator 12 uses to modify various policies of elements 5. For example, the interface enables administrator 12 to delete or change the ordering of existing policy rules and to insert new rules in a current policy of one of elements 5 to produce an updated policy for the element. Upon producing the updated policy, administrator 12 directs device management system 10 to modify the configuration of the element based on the updated policy. In some aspects, device management system 10 automatically modifies policies of elements 5 as a response to, for example, changing network conditions.

In the example of FIG. 1, device management system 10 comprises command generation module 14 ("CGM 14"), which generates, based on updated policies produced by administrator 12, a series of commands for modifying policies in one or more of elements 5. Each of the commands may direct one of elements 5 to insert a new rule into a current policy, delete an existing rule, or move an existing rule to a new relative position in the ordered list of rules that make up the policy.

In accordance with the techniques of this disclosure, command generation module 14 comprises longest increasing subsequence (LIS) module 15 that command generation module 14 uses to determine, given a current policy and an updated policy, a set of reorder commands that will conform the current policy to the updated policy. As described in detail below, LIS module 15 uses an LIS algorithm to determine an LIS of rules for the updated policy.

The LIS may refer to a data structure (e.g., an array, linked list, etc.) configured to store indexes assigned to the policy rules of the updated policy, where the LIS is indicative of a longest subset of the plurality of policy rules that have a same ordering in both a source list and a destination list. The source list may represent a list of indexes assigned to the policy rules in the first ordering of the currently configured policy, while the destination list may represent the list of indexes assigned to the policy rules in the second ordering of the updated policy.

LIS module 15 may compute the LIS using a variation of a patience sorting algorithm. The patience sorting algorithm refers to a sorting algorithm that is named after the card game referred to as "patience." In patience, a player takes a sorted deck of cards and deals the cards one by one into a sequence of piles on the table according to three rules. Initially, there are no piles, and an initial dealt card forms a new pile consisting of the single card. Second, each subsequent card is placed on the leftmost existing pile whose top card has a value greater than or equal to the new card's value, or to the right of all the existing piles (thus forming a new pile). When there are no more cards remaining in the deck, the game ends.

The patience sorting algorithm produces piles of "cards" (which in this instance are indexes") that are sorted in descending order (or, in other words, from highest value to lowest value). The pile of "cards" having the most number of cards (relative to the other piles) forms the longest increasing subsequence. More information regarding an optimal patience sorting algorithm can be found in a paper by Bespamyatnikh, Sergie, et al. entitled "Enumerating Longest Increasing Subsequences and Patience Sorting," published November, 2000 in Information Processing Letters, volume 76 (1-2): 7-1, the entire contents of which are incorporated herein by reference. In any event, LIS module 15 may return a data structure (e.g., an array, linked list, etc.) specifying the piles of cards (which again may refer to indexes) to command generation module 14.

Command generation module 14 may identify indexes in the remaining piles of cards produced by the variation of the patience sorting algorithm as being out of order in the updated policy relative to the order in the current policy. Command generation module 14 may identify the piles of cards having less cards than the number of cards in the longest increasing subsequence as being out of order. Command generation module 14 may then search the destination list, using each index in the remaining piles of cards, to identify an index in the array or other data structure representative of the destination list. The location in the destination list may be referred to as the destination index (e.g., an array index), which is separate from the value stored at the element identified by the destination index, which may be referred to as the assigned index.

Command generation module 14 may then generate a reorder command to move the policy rule from the assigned index (e.g., the value in the destination list) to the destination index of the destination list element at which the assigned index was stored. Command generation module 14 may then iterate through each assigned index in the remaining piles of cards (excluding the pile of cards providing the longest increasing subsequence), generating reorder commands to move policy rules having the assigned index to the destination index at which the assigned index is stored in the destination list. In this way, command generation module 14 may generate, based on the LIS, one or more policy configuration commands for the managed network device (e.g., one or more of elements 5) that direct the managed network device to conform the currently configured policy to the updated policy. Device management system 10 may then output, via an interface, the one or more policy configuration commands (e.g., the reorder commands noted above) to the managed network device.

Command generation module 15 may thereby more optimally generate reorder commands through the use of LIS in comparison to other ways by which to generate reorder commands that involve longest common subsequences (LCS) or other algorithms. Because many network devices often include hundreds or even thousands of policy rules, even minor changes in a policy configuration can require numerous reorder commands that consume significant network and device resources when the updates are performed by an inefficient configuration update process. In some situations, a large amount of reorder commands can even cause a device to crash or otherwise be rendered inoperable for a time. Using the techniques described herein may reduce a number of reorder commands needed and may therefore reduce the amount of network resources needed to reconfigure a device. Moreover, compared to alternative ways by which the device management system may compute the reorder commands (such as by way of determining a longest common subsequence—LCS), using LIS may reduce computational and/or space complexity, resulting in more efficient operation of device management systems (in terms of number of processor cycles expended, memory space consumed, and/or memory bus bandwidth utilization).

Figure 2:
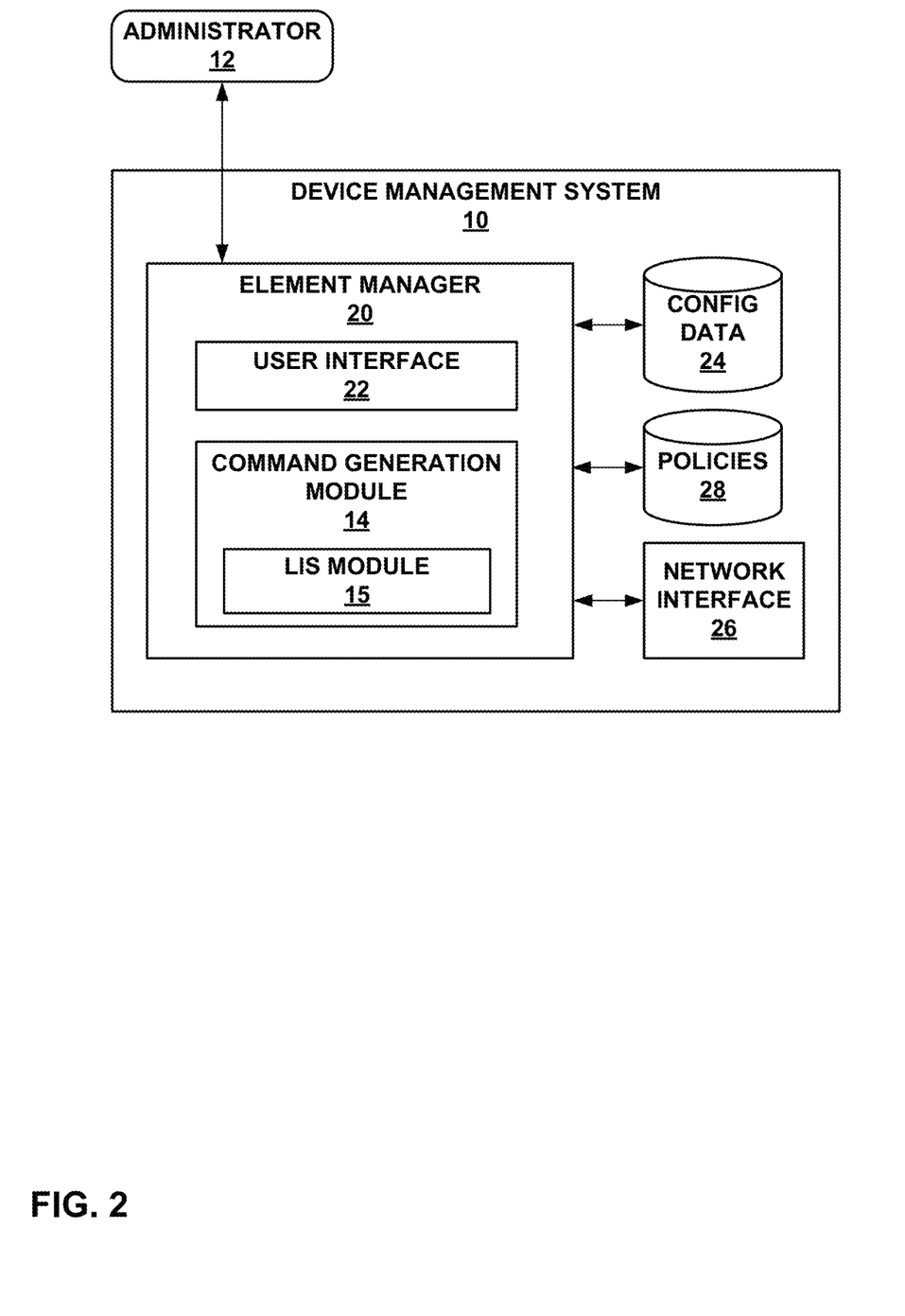
FIG. 2 is a block diagram illustrating an example device management system modified to generate commands for reordering a list of policy rules in accordance with the disclosures herein.

FIG. 2 is a block diagram illustrating one example of device management system 10 in further detail. In this example, administrator 12 interacts with element manager 20 of device management system 10 via user interface 22 to locally maintain and modify configuration data and network device policies, and to install the configuration data and policies to the appropriate network device (e.g., one or more of elements 5 shown in the example of FIG. 1) using a device management protocol. User interface 22 may include a command-line interface (CLI), a graphical user interface (GUI), a file interface that can receive data files that include policy rules or configuration data, or another interface that enables administrator 12 to interact with element manager 20.

Device management system 10 further includes databases of device policies 28 and configuration data 24 (illustrated as "config data 24") that store and maintain policies and configuration data, respectively, for elements 5 of enterprise network 2. In some instances, device policies 28 are stored within a separate policy server (not shown), and device management system 10 queries the policy server to update, retrieve, and manage (e.g., modify) the policies. In some instances, device policies 28 are stored only by the managed devices, e.g., elements 5, and device management system 10 queries the managed devices to update, retrieve, and manage (e.g., modify) the policies. Device policies 28 may include policies for a number of different policy areas, e.g., security, routing, and QoS. Examples of configuration data for network devices that process and forward network traffic are shown in U.S. Pat. No. 7,062,546, the content of which is incorporated by reference herein in its entirety. Further details on management systems and the application of schemas for verification of configuration data are found in U.S. Pat. No. 8,156,213, the entire contents of which is incorporated by reference herein.

In general, a policy is a set of one or more policy rules that specify conditions as well as corresponding actions that cause a network device to operate in a particular manner upon satisfaction of the condition. Conditions may define match conditions for packets and packet flows within enterprise network 2. A condition may apply to any level of Open Systems Interconnect (OSI) model or the Transmission Control Protocol/Internet Protocol (TCP/IP) model. For example, a condition may match a particular transport protocol or layer-two (L2) parameters (e.g., source or destination port), a particular network protocol or layer three (L3) parameters (e.g., source or destination network address, a packet length, header information), an application protocol or application-layer (L7) parameter or pattern (e.g., a specific HTML pattern within the payload data to detect malicious byte sequences) and various other packet classifications. Conditions may also be interface-specific, such as by specifying specific physical or logical interfaces on which to apply the policies. Corresponding actions for the network device to perform upon occurrence of a condition concern the action the network device takes with respect to the packet or packet flow. These may include, e.g., filtering, forwarding, rate limiting, assigning to a forwarding class, mirroring for traffic analysis, NAT translation, and the like.

Element manager 20 provides methods for managing a network of devices, such as enterprise network 2, by exchanging messages with the devices via network interface 26. In general, such messages are exchanged as part of a configuration session (e.g., configuration session 9A involving element 5A) established using a network configuration protocol, such as SNMP. During a configuration session with a managed device, for example, element manager 20 exchanges commands, configuration-related data, and/or policies with the managed device. Administrator 12 may interface with element manager 20 via user interface 22 in order to perform policy and configuration management tasks. User interface 22 provides methods for deleting, inserting, and changing the order of policy rules in a policy.

In some instances, element manager 20 automatically performs policy and configuration management tasks (e.g., via scripts) in order to rapidly handle policy-related issues or to relieve the administrative burdens of managing enterprise network 2. For example, element manager 20 may periodically poll elements 5 to determine whether the respective policies are consistent with the requirements of enterprise network 2. As one example, element manager 20 may require elements 5 to include a policy rule that denies network access to all packets originating from a particular network source. If, in response to a query from element manager 20, element 5A indicates that the policy rule is not installed on element 5A, element manager 20 automatically sends a command via a configuration session directing element 5A to install the policy rule.

In some embodiments, element manager 20 is an extension of the Juniper Networks Network and Security Manager (NSM) application as described in Juniper Networks, "Juniper Networks Network and Security Manager Administration Guide Revision 2009.1," August 2009, available at http://www.juniper.net/techpubs/software/management/security-manager/nsm2009_1/nsm-admin-guide.pdf, and "Junos Space Security Director" accessed June 2021 at https://wwwduniper.net/us/en/products/security/security-director-network-security-management.html, each of which is incorporated herein by reference in its entirety.

Element manager 20 updates the policy data in device policies 28 in accordance with modifications made by administrator 12 to ensure that the policy data is consistent with the operational policies for the corresponding one or more of elements 5. If one of elements 5 were to fail, element manager 20 pushes the policy data in device policies 28 to a replacement for the failed element in order to restore the replacement to the most recent policy configuration. In some instances, element manager 20 may perform bulk policy configuration of multiple elements 5. That is, element manager 20 may push a set of policy rules sequentially or simultaneously to multiple elements 5 via enterprise network 2.

As described above, a policy for one of elements 5, e.g., element 5A, comprises an ordered list of policy rules that are each keyed to an identifier unique within the ordered list. In the example of FIG. 2, element manager 20 may delete, insert, and/or change the order of policy rules in a policy in device policies 28 for element 5A in order to specify certain operational characteristics for element 5A that further network objectives. That is, element manager 20 may modify the component policy rules or the arrangement thereof of a policy for element 5A to produce an updated policy for element 5A. In some instances, the policy is retrieved from device policies 28 or a policy server and temporarily stored in element manager 20 for manipulation, and element manager 20 may later update device policies 28 or the policy server with an updated policy.

Element manager 20 comprises command generation module 14 that generates policy configuration commands for modifying policies in elements 5 based on updated policies produced by element manager 20. Exemplary command generation module 14 may generate: an "INSERT [rule]" command to insert a policy rule (rule) at the end of the ordered list that forms a particular policy; a "DELETE" command to remove, provided a unique identifier, the policy rule in the policy that is keyed to the unique identifier; and a "MOVE" command to move a policy rule before ("BEFORE") or after ("AFTER") another policy rule in the ordered list. Policy rules are referenced by the unique identifiers to which they are keyed, referred to hereinafter as policy rule identifiers. The full syntax of a MOVE command, in this example, is "MOVE <id1>[BEFORE|AFTER] <id2>", which causes a receiving one of elements 5 to move the rule identified by id1 to a position relative to the rule identified by id2. As an example of a MOVE command, if administrator 12 specifies an updated policy that modifies the ordering of the policy rule such that a policy rule with ID=2 is moved to immediately follow a policy rule with ID=5, then command generation module 14 generates the command "MOVE 2 AFTER 5". In other embodiments, the particular form of a move command may vary. For example, an embodiment may provide two commands, "MOVEAFTER" and "MOVEBEFORE", which operate on arguments specifying policy rule identifiers. The MOVE command may also be referred to as a reorder command, as the MOVE command reorders policy rules relative to one another.

In accordance with the techniques of this disclosure, command generation module 14 comprises LIS module 15 that determines the above noted LIS, which is used by command generation module 14 to generate a set of MOVE commands for a policy currently configured on one of elements 5 (e.g., element 5A) that, when sent to the element, causes the element to rearrange (or, in other words, reorder) the policy rules of the policy. In some instances, the commands generated by command generation module 14 conform the arrangement of the policy rules to the ordering specified by an updated policy produced by element manager 20 in potentially the fewest possible number of MOVE commands.

LIS module 15 receives two ordered lists of policy rule identifiers from command generation module 14. The first list comprises the ordered list of policy rule identifiers for a policy currently configured on one of elements 5 and is referred to hereinafter as the "source list." The second list comprises the ordered list of policy rule identifiers for an updated policy, as produced by element manager 20 for the currently configured policy, and is referred to hereinafter as the "destination list."

In exemplary device management system 10, command generation module 14 handles INSERT and DELETE commands after exercising LIS module 15. As a result, the source list and destination list contain identical sets of policy rules in various orderings. That is, supposing that set A comprises all policy rules in the source list and set B comprises all policy rules in the destination list, then A⊆B and B⊆A. In some instances, the source list and destination list may each contain different sets of policy rules. That is, the destination list may include policy rules that are not members of the source list, and vice versa.

Provided a source list and destination list, LIS module 15 first assigns a sequentially increasing index to each policy rule in the source list. For example, consider the following policy rules specified in the source list, which LIS module 15 has assigned sequentially increasing indexes:

| Rules: | R1 | R2 | R3 | R4 | R5 | R6 | R7 | R8 |
|---|---|---|---|---|---|---|---|---|
| Index: | 1 | 2 | 3 | 4 | 5 | 6 | 7 | 8 |

LIS module 15 may next obtain, based on the sequentially assigned indexes, an order sequence that identifies rules R1-R8 (where R1-R8 may each represent an example of the above noted unique ID) in the destination list by their corresponding index in the above table. In other words, LIS module 15 may obtain the following order sequence that identifies policy rules R1-R8 in the destination list relative to the sequentially increasing indexes assigned to rules R1-R8 in the source list. Below follows an example destination list that includes rules R1-R8 according to a second order from which LIS module 15 may determine the example order sequence (OS).

| Rules: | R7 | R5 | R6 | R4 | R2 | R1 | R8 | R3 |
|---|---|---|---|---|---|---|---|---|
| OS: | 7 | 5 | 6 | 4 | 2 | 1 | 8 | 3 |

LIS module 15 may next determine the LIS of the order sequence according to the variation of the patience algorithm. This variation of the patience algorithm may, based on how the patience algorithm is implemented, identify the longest increasing subsequence starting from either end of the OS. In operation, LIS module 15 may determine different piles of cards (e.g., which is the index in our example or any other representation of a value). In the following example, LIS module 15 may determine the following:

| Pile 1 | Pile 2 | Pile 3 |
|---|---|---|
| 7 | 6 | 8 |
| 5 | 4 | 3 |
|   | 2 |   |
|   | 1 |   |

In the above example, LIS module 15 may traverse the above order sequence and assign the first card (index 7) to a first pile, Pile 1. LIS module 15 may access the next card (index 5) and, using the three rules noted above for the patience algorithm, assign index 5 to Pile 1 because five is less than or equal to seven. Pile 1 now has a top value of five.

LIS module 15 may access the next card in the order sequence (which represents a shuffled deck of cards) and compare the third card (index 6) to the top value of Pile 1. As six is greater than five, LIS module 15 creates Pile 2 and adds the value of six to Pile 2. LIS module 15 may continue in this manner until all of the cards are assigned to Pile 1, Pile 2, and Pile 3. Each of Pile 1-Pile 3 represent a sorted subsequence (and do not need to be contiguous). The longest increasing subsequence is represented by the one of Pile1-Pile 3 having the most number of cards (or, in other words, separate indexes).

In the above example, LIS module 15 may select Pile 2 as the longest increasing subsequence. The LIS for the source list and destination list is the longest subsequence of policy rules that have the same ordering in both lists. The source list and destination list may have multiple longest increasing subsequences. LIS module 15 may return Pile 2 as the longest increasing subsequence and Pile 1 and Pile 3 as the remaining subsequences. In some examples, LIS module 15 may return more than one Pile as longest increasing subsequences.

In this example, the variation of the patience algorithm provided above has a big-O notation (which is a common complexity measurement found in computer science) computational complexity of O(n log n), where n refers to the number of cards (or, in this instance, indexes, where n equals eight in the above example). This computational complexity is comparable to longest common subsequences (LCS) algorithms. However, unlike LCS algorithms, the storage complexity is O(n), as we only need space for the order sequence (which is n) and the piles, which again is n. Given that O(n)+O(n) equals O(2n), it is common to reduce this to a simple linear space complexity of O(n). In contrast, LCS algorithms may have a storage complexity of $O(n^2)$, which may be prohibitive amounts of storage space (which is what storage complexity denotes) when considering that some policy databases may store upwards of 80,000 policy rules.

After determining an LIS for the provided source list and destination list, command generation module 14 uses the LIS as a basis for rearranging the policy rules. Command generation module 14 generates MOVE commands for each of the policy rules in the destination list that are not in the LIS ("non-LIS policy rules") in order to move the non-LIS policy rules to a position relative to policy rules that are in the LIS ("LIS policy rules"). Specifically, command generation module 14 iterates, in order, through the destination list to identify non-LIS policy rules. Upon iterating to a non-LIS policy rule, command generation module 14 generates a MOVE command to move the rule to a position in the ordering relative to the first LIS policy rule that is ordered subsequent to the rule in the destination list. If no LIS policy rules follow the rule in the destination list, command generation module 14 instead generates a MOVE command to move the rule to a position in the ordering relative to either the last LIS policy rule in the destination list or a previous policy rule in the destination list.

The iteration process performed by command generation module 14 runs with O(n) computational complexity on a destination list and source list of size n, leading to an overall complexity of O(n log n)+O(n) that is asymptotically dominated by O(n log n). In addition, because command generation module 14 generates a policy configuration command for each non-LIS policy rule, the total number of commands, K, generated is calculated according to the formula K=n—length (LIS).

By executing the MOVE commands generated by command generation module 14 for a particular source list and destination list, a managed device, such as one of elements 5, can rearrange a currently configured policy that includes policy rules arranged similarly to the source list to produce an updated policy with policy rules arranged similarly to the destination list.

Command generation module 14 uses the MOVE commands as a basis and adds INSERT and DELETE commands as necessary to further conform a currently configured policy on one or more of elements 5 to the updated policy produced by element manager 20. In some embodiments, command generation module 14 generates DELETE commands prior to sending a source list and destination list to LIS module 15. For exemplary elements 5, an INSERT [rule] command causes elements 5 to insert rule at the end of an ordered list of policy rules. For inserting a policy rule at a particular location in a policy, therefore, exemplary command generation module 14 produces both an INSERT command to first insert the rule and a MOVE command to shift the inserted rule to the appropriate position specified by the updated policy.

After command generation module 14 generates the commands needed to conform a currently configured policy of one or more of elements 5 to an updated policy specified by element manager 20, command generation module 14 sends the commands to the appropriate ones of elements 5 via network interface 26. The receiving elements execute the commands to update the policies.

Generating MOVE commands using LIS according to techniques herein described may create a similar if not substantially similar number of MOVE commands relative to LCS-based algorithms needed to conform a currently configured policy to an updated policy. More information regarding LCS-based algorithms can be found in U.S. Pat. No. 8,429,255, the contents of which are hereby incorporated by reference as if set forth in their entirety. For enterprise network 2, this may provide similar if not the same number of packets required to transmit all necessary commands to one or more of managed elements 5 as that provided by LCS-based algorithms. Furthermore, maintaining fewer commands tends to maintain the amount of time required to update one or more of managed elements 5 and also tends to reduce the likelihood of a device or network outage. However, as noted above LIS-based algorithms may substantially reduce an amount of memory required to identify the MOVE commands relative to LCS-based algorithms, thereby improving operation of device management system 10 itself.

Element manager 20, including user interface 22, command generation module 14 and LIS module 15, may be implemented as program code (i.e., executable software instructions) that executes within an operating environment of device management system 10. Device management system 10 may, for example, include one or more microprocessors for executing instructions stored in a tangible computer-readable storage medium.

Figure 3:
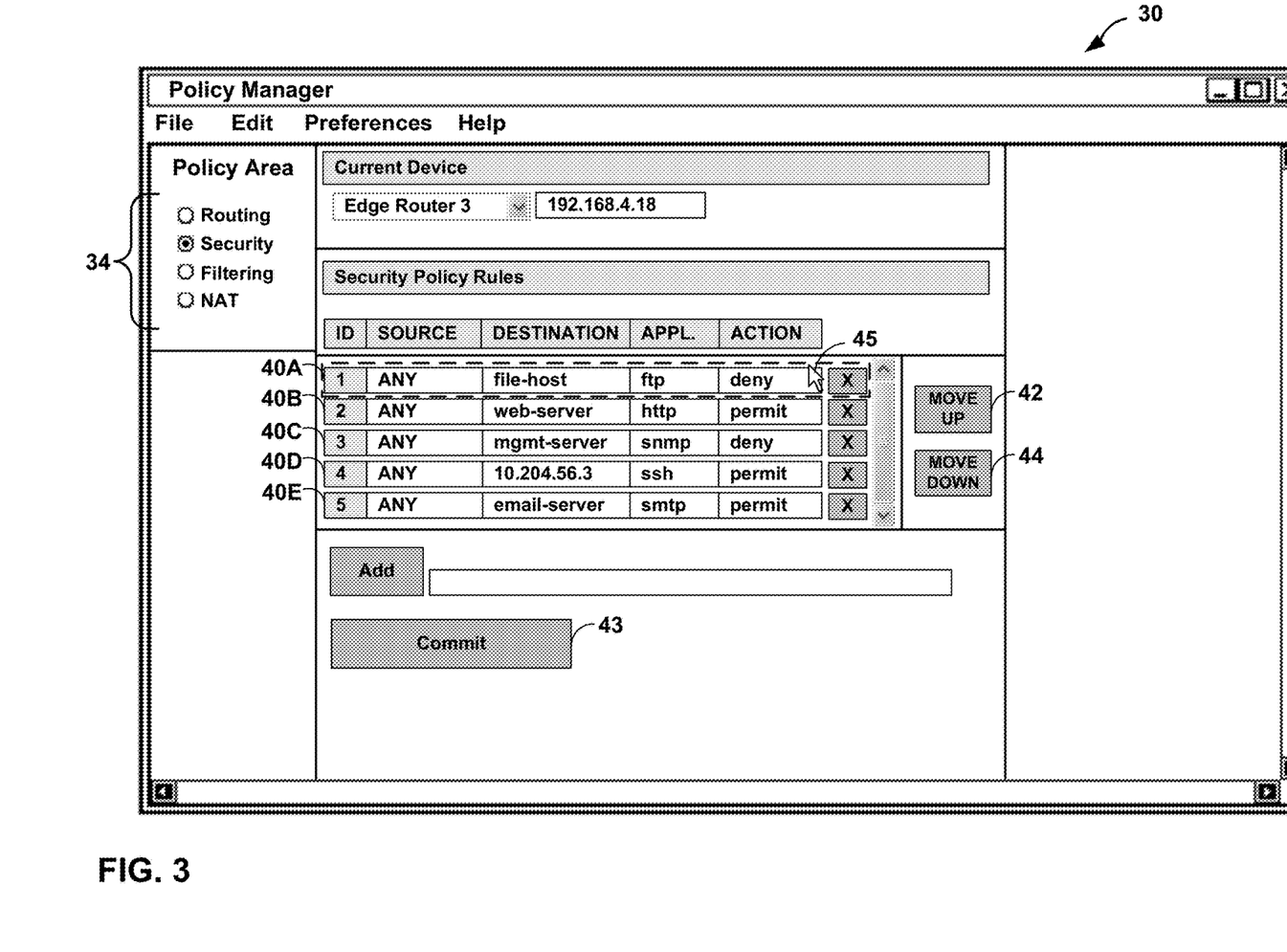
FIG. 3 is an exemplary screenshot of a policy manager application running on a device management system that illustrates a list of policy rules.

FIG. 3 illustrates an exemplary screenshot 30 for user interface 22 of element manager 20 of the device management system 10 of FIG. 2. Exemplary user interface 22 presents policy rules according to categories 34. Screenshot 30 illustrates an ordered list of security policy rules 40A-40E ("security policy rules 40") that comprise the security policy currently configured on the current one of elements 5 ("Edge Router 3") being managed by element manager 20. Other policies configured include, for example, routing, filtering, and NAT policies. Each of security policy rules 40A-40E is associated with a unique identifier 1-5, respectively. User interface 22 illustrates the unique identifier for security policy rules 40 in the "ID" column. The illustrated security polices rules 40 are exemplary. The security policy and other policies for one of elements 5, in some instances, comprise any number and variety of policy rules.

User interface 22 comprises move up button 42 and move down button 44 that enable a user, having selected one of security policy rules 40A-40E with mouse point 45, to alter the position of the selected policy rule within the ordered list of the security policy. In screenshot 30, a user (such as administrator 12) has selected security policy rule 40A having ID=1. By pressing move down button 44, the user can move security policy rule 40A down the ordered list to a new position. A user may decide to alter the ordering of policies for a number of reasons. These reasons may include, for example, improving the efficiency of the application of a policy to received network packets and eliminating an instance of rule shadowing in a current configuration.

Figure 4:
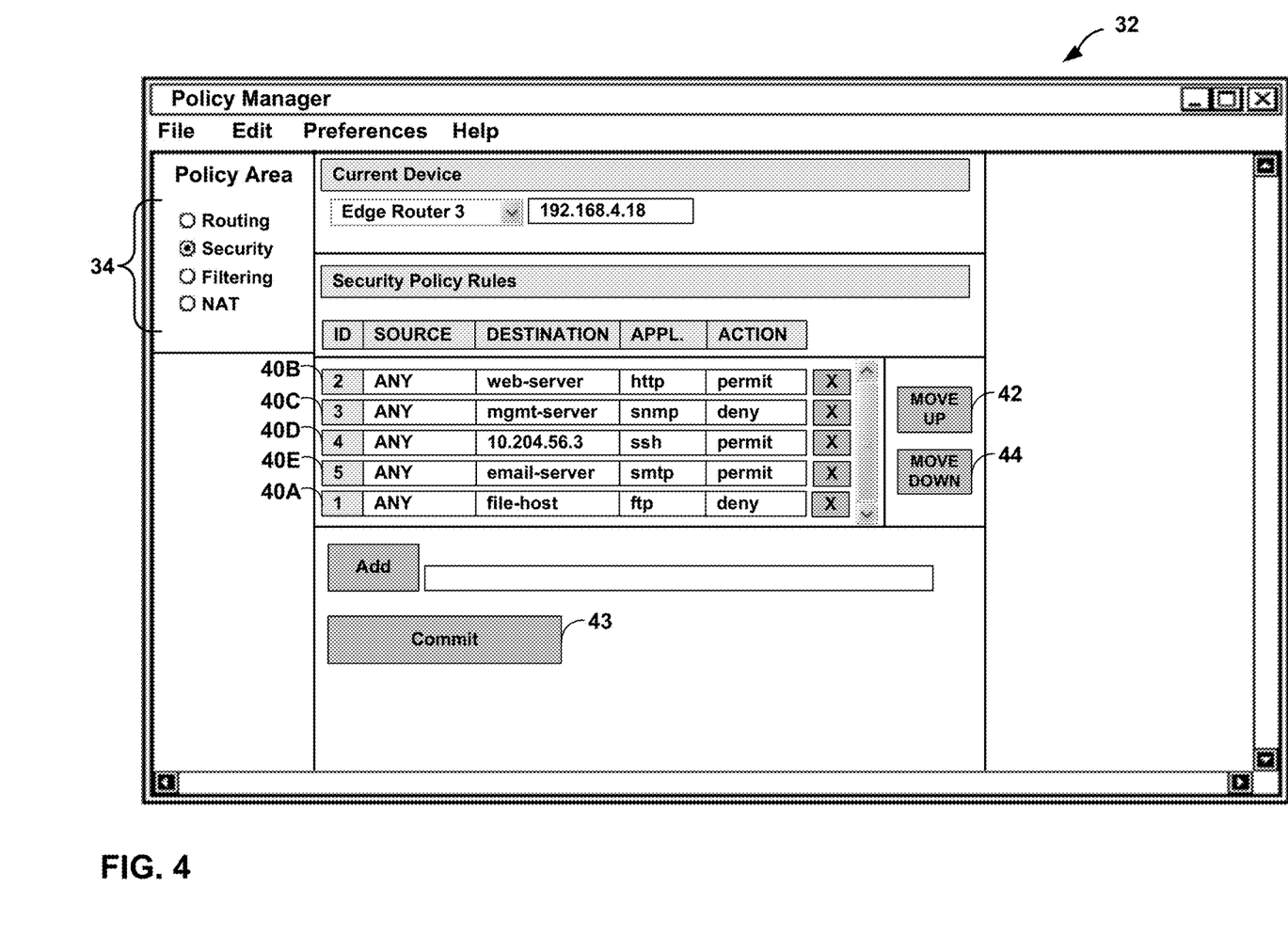
FIG. 4 is an exemplary screenshot of a policy manager application running on a device management system that illustrates a modified list of policy rules.

FIG. 4 is illustrates an additional exemplary screenshot 32 that shows security policy rules 40 arranged into an updated ordering. More specifically, security policy rule 40A occupies the last position in the ordered list of the security policy, in contrast to the currently configured ordering of security policy rules 40 as illustrated in screenshot 30.

User interface 22 further comprises commit button 43 that, when pressed, directs element manager 20 to invoke command generation module 14 to process the currently configured ordering and the updated ordering of a policy to produce a reduced set of commands that will conform the currently configured policy on the current one of elements 5 ("Edge Router 3") being managed to the updated ordering shown in screenshot 32. In response, element manager 20 sends ordered lists for both the currently configured ordering of unique identifiers for security policy rules 40 and the updated ordering of unique identifiers for security policy rules 40 to command generation module 14. Command generation module 14 converts the currently configured ordering to a source list and the updated ordering to a destination list and then feeds the source list and destination list to LIS module 15, which performs LIS-based techniques described herein.

Figure 5:
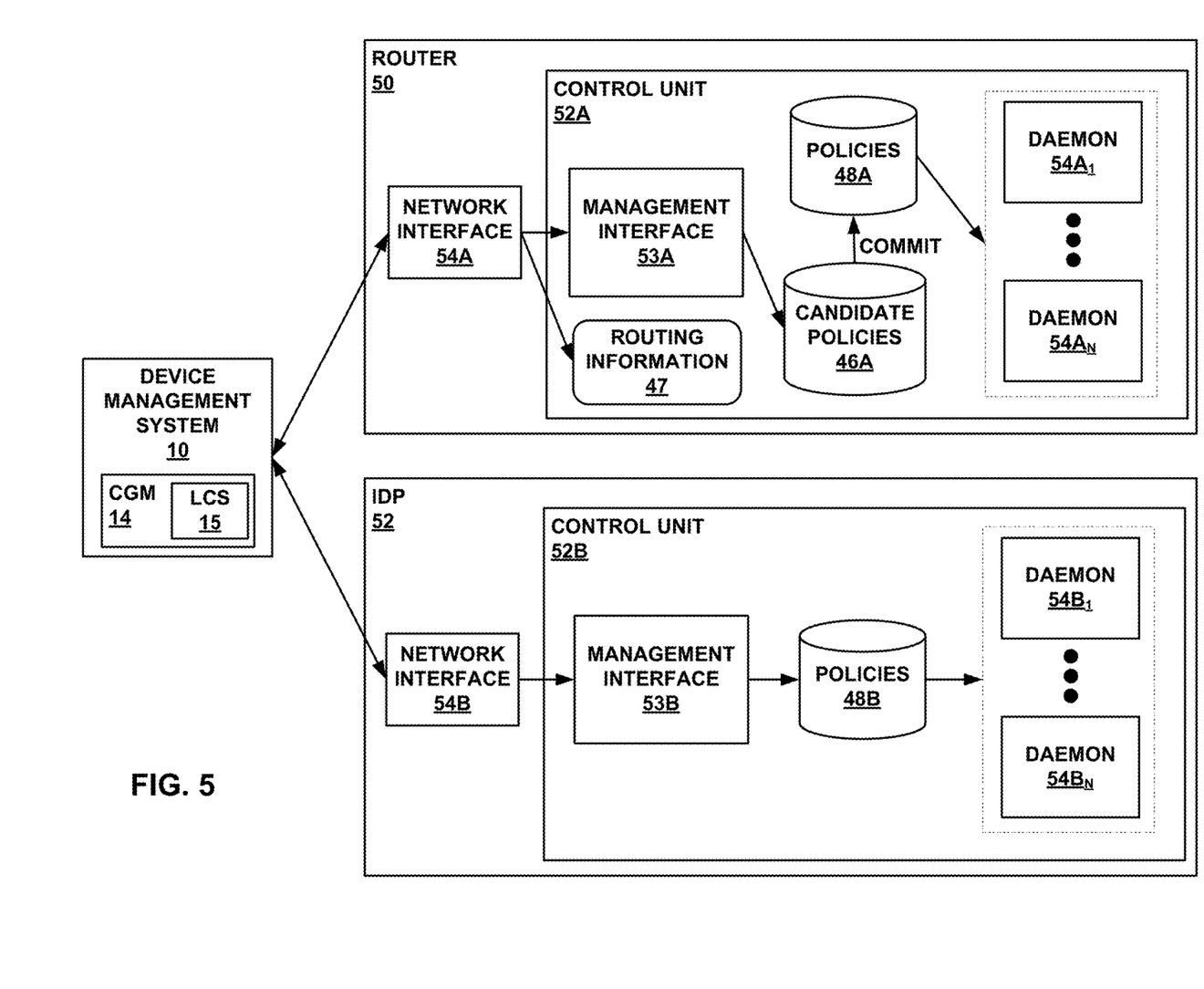
FIG. 5 is a block diagram illustrating, in further detail, two exemplary enterprise elements that receive commands for reordering a list of policy rules generated by a device management system according to the techniques described.

FIG. 5 is a block diagram illustrating, in detail, a router 50 and an intrusion detection and prevention device 52 ("IDP 52") that each receive commands for reordering a list of policy rules generated by device management system 10 according to the techniques described. Router 50 and IDP 52 may each represent one of elements 5 in the enterprise network 2 illustrated in FIG. 1.

Router 50 maintains routing information 47 that describes available routes through a network. Upon receiving an incoming data packet, the router examines header information within the packet to identify the destination for the packet. Based on the header information, the router accesses routing information 47, selects an appropriate route for the packet and forwards the packet accordingly. IDP 52 provides intrusion detection and prevention services for a network, such as enterprise network 2, and performs stateful inspection of application-layer data for packet flows between source devices and destination devices.

Router 50 and IDP 52 comprise a respective one of control units 52A and 52B that provide an operating environment for daemons $54A_1$-$54A_N$ and $54B_1$-$54B_N$ ("daemons 54"), which represent various software processes. Each of daemons 54 may comprise, for example, a routing protocol daemon, a device control daemon, a packet inspection daemon, a NAT daemon, a security daemon, or other type of application. Various embodiments of router 50 and IDP 52 may include more, fewer, or different daemons.

Router 50 and IDP 52 further comprise a respective one of policies 48A and 48B ("policies 48"). Policies 48 comprise policy configuration data for the respective device that includes policies to direct the operation of one or more of daemons 54. Daemons 54 that operate according to one or more policies in policies 48 execute the policy rules of the policies according to a specified ordering. As one example, policies 48B may include a security policy composed of security policy rules that direct the operation of daemon $54B_1$. Each of policies 48 may maintain policy configuration data in the form of one or more tables, linked lists, databases, flat files, or any other data structure. Each of policies 48 may comprise a database server that accepts queries.

Router 50 and IDP 52 also include a respective one of management interfaces 53A and 53B ("management interfaces 53"), which exposes a set of functions by which a remote management device, e.g., device management system 10, may configure the device. Management interfaces 53 receive commands, via a respective one of network interfaces 54, from a remote management device that direct the management interfaces 53 to modify the associated one of policies 48. Exemplary management interfaces 53 accept the INSERT, DELETE, and MOVE [BEFORE AFTER] policy management commands sent by device management system 10 and described above with respect to FIG. 2.

In response to receiving a policy management command, management interface 53B of IDP 52 modifies policies 48B by writing to, transmitting a database query to, or otherwise manipulating policies 48B to execute the command. Management interface 53B progressively modifies policies 48B one command at a time. Modifications to policies 48B take effect immediately. In some instances, management interface 53B may receive a number of commands that comprise a comprehensive policy update. Once management interface 53B executes the first command in such an update, IDP 52 may be operating in an intermediate state that may subject IDP 52 to indeterminate device behavior. IDP 52 may continue operating in this state until management interface 53B executes the final command in the update, at which time the policy update is complete.

Router 50 further comprises candidate policies 46A, which stores temporary policy configuration data for eventual publication to policies 48A. Candidate policies 46A may maintain policy configuration data in the form of one or more tables, linked lists, databases, flat files, or any other data structure. Candidate policies 46A may comprise a database server that accepts queries.

In response to receive a policy management command, management interface 53A of router 50 modifies candidate policies 46A writing to, transmitting a database query to, or otherwise manipulating candidate policies 46A to execute the command. In this example, after sending router 50 a set of policy management commands, device management system 10 sends a commit command to management interface 53B directing router 50 to publish temporary policy configuration data of candidate policies 46A to policies 48A. In response to a commit command, management interface 53B generates a patch by comparing changes made to candidate polices 46A with the policy configuration data of policies 46A. Management interface 53B applies the patch into policies 46A to complete the update.

Router 50 and IDP 52 receive policy management commands generated according to the techniques of this disclosure. As a result, router 50 and IDP 52 may receive fewer commands as compared to commands generated according to conventional techniques. For both router 50 and IDP 52, as well as other ones of elements 52, receiving fewer commands reduces the time required to perform management tasks, including handling network packets that contain commands, updating policies 48, maintaining configuration sessions with device management system 10. A reduction in the number of commands received may also decrease the likelihood of downtime caused by overburdening device resources, with concomitant gains in network performance. In addition, reducing the number of commands received may reduce the time spent, by IDP 52, in an indeterminate policy configuration state.

Figure 6:
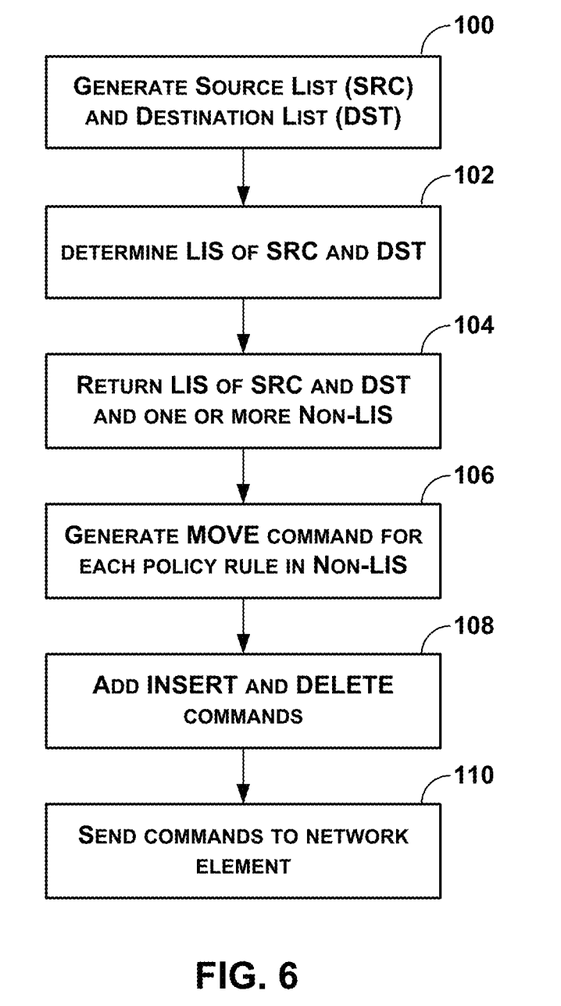
FIG. 6 is a flowchart illustrating an example mode of operation for performing command generation techniques herein described.

FIG. 6 is a flowchart illustrating an example mode of operation for performing command generation techniques herein described. Command generation module 14 may initially generate a source list representative of the plurality of policy rules in the first order and a destination list representative of the plurality of policy rules (e.g., the same set of policy rules in the destination list) in a different second order (100). Command generation module 14 may invoke LIS module 15, passing the source list and the destination list to LIS module 15.

LIS module 15 may next determine a longest increasing subsequence of the source list and destination list in the manner described above (e.g., with respect to FIG. 2) (102). Briefly, LIS module 15 may first assign a sequentially increasing index to each policy rule in the source list. LIS module 15 may next obtain, based on the sequentially assigned indexes, an order sequence that identifies policy rules in the destination list by their corresponding index assigned in the source list. LIS module 15 may next determine the LIS of the order sequence according to the variation of the patience algorithm, which returns one or more piles as LIS and one or more remaining piles that are non-LIS (104).

After determining an LIS for the provided source list and destination list, command generation module 14 uses the LIS as a basis for rearranging the policy rules. Command generation module 14 generates MOVE commands for each of the policy rules in the destination list that are not in the LIS ("non-LIS policy rules") in order to move the non-LIS policy rules to a position relative to policy rules that are in the LIS ("LIS policy rules") (106). Specifically, command generation module 14 iterates, in order, through the destination list to identify non-LIS policy rules (in instances, where LIS module 15 only returns one or more LIS). Upon iterating to a non-LIS policy rule, command generation module 14 generates a MOVE command to move the rule to a position in the ordering relative to the first LIS policy rule that is ordered subsequent to the rule in the destination list. If no LIS policy rules follow the rule in the destination list, command generation module 14 instead generates a MOVE command to move the rule to a position in the ordering relative to either the last LIS policy rule in the destination list or a previous policy rule in the destination list.

By executing the MOVE commands generated by command generation module 14 for a particular source list and destination list, a managed device, such as one of elements 5, can rearrange a currently configured policy that includes policy rules arranged similarly to the source list to produce an updated policy with policy rules arranged similarly to the destination list.

Command generation module 14 uses the MOVE commands as a basis and adds INSERT and DELETE commands as necessary to further conform a currently configured policy on one or more of elements 5 to the updated policy produced by element manager 20 (108). In some embodiments, command generation module 14 generates DELETE commands prior to sending a source list and destination list to LIS module 15. For exemplary elements 2, an INSERT [rule] command causes elements 2 to insert rule at the end of an ordered list of policy rules. For inserting a policy rule at a particular location in a policy, therefore, exemplary command generation module 14 produces both an INSERT command to first insert the rule and a MOVE command to shift the inserted rule to the appropriate position specified by the updated policy.

After command generation module 14 generates the commands needed to conform a currently configured policy of one or more of elements 5 to an updated policy specified by element manager 20, command generation module 14 sends the commands to the appropriate ones of elements 5 via network interface 26 (110). The receiving elements execute the commands to update the policies.

The techniques described in this disclosure may be implemented, at least in part, in hardware, software, firmware or any combination thereof. For example, various aspects of the described techniques may be implemented within one or more processors, including one or more microprocessors, digital signal processors (DSPs), application specific integrated circuits (ASICs), field programmable gate arrays (FPGAs), or any other equivalent integrated or discrete logic circuitry, as well as any combinations of such components. The term "processor" or "processing circuitry" may generally refer to any of the foregoing logic circuitry, alone or in combination with other logic circuitry, or any other equivalent circuitry. A control unit comprising hardware may also perform one or more of the techniques of this disclosure.

Such hardware, software, and firmware may be implemented within the same device or within separate devices to support the various operations and functions described in this disclosure. In addition, any of the described units, modules or components may be implemented together or separately as discrete but interoperable logic devices. Depiction of different features as modules or units is intended to highlight different functional aspects and does not necessarily imply that such modules or units must be realized by separate hardware or software components. Rather, functionality associated with one or more modules or units may be performed by separate hardware or software components, or integrated within common or separate hardware or software components.

The techniques described in this disclosure may also be embodied or encoded in a computer-readable medium, such as a computer-readable storage medium, containing instructions. Instructions embedded or encoded in a computer-readable medium may cause a programmable processor, or other processor, to perform the method, e.g., when the instructions are executed. Computer readable storage media may include random access memory (RAM), read only memory (ROM), programmable read only memory (PROM), erasable programmable read only memory (EPROM), electronically erasable programmable read only memory (EEPROM), flash memory, a hard disk, a CD-ROM, a floppy disk, a cassette, magnetic media, optical media, or other computer-readable storage media. It should be understood that the term "computer-readable storage media" refers to physical storage media, and not signals or carrier waves, although the term "computer-readable media" may include transient media such as signals, in addition to physical storage media.

Various embodiments of the invention have been described. These and other embodiments are within the scope of the following claims.

The invention claimed is:

1. A network management device comprising:
a memory configured to store a currently configured policy for a managed network device and an updated policy for the managed network device, wherein the currently configured policy comprises a plurality of policy rules in a first ordering, and the updated policy comprises the plurality of policy rules in a second ordering,
one or more processors configured to:
assign a sequentially increasing index to each of the plurality of policy rules in the first ordering;
obtain an order sequence that identifies the plurality of policy rules in the second ordering relative to the sequentially increasing indexes assigned to the plurality of policy rules in the first ordering;

apply a variation of a patience sorting algorithm to the order sequence;

determine, based on the order sequence, a longest increasing subsequence between a source list comprising the plurality of policy rules in the first ordering and a destination list of the plurality of policy rules in the second ordering, wherein the longest increasing subsequence is indicative of a longest subset of the plurality of policy rules that have a same ordering in both the source list and the destination list; and generate, based on the longest increasing subsequence, one or more policy configuration commands for the managed network device that direct the managed network device to conform the currently configured policy to the updated policy; and an interface configured to output the one or more policy configuration commands to the managed network device.

2. The network management device of claim 1,
wherein the one or more processors are configured, when configured to generate the one or more policy configuration commands, to:

refrain from generating policy configuration commands with respect to the longest increasing subsequence; and process each index in the one or more remaining subsequences to generate a policy configuration command to move a policy rule of the plurality of policy rules from the assigned sequentially increasing index to a location at which the assigned sequentially increasing index is stored in the order sequence.

3. The network management device of claim 2, wherein the one or more processors are configured, when configured to process each index in the one or more remaining subsequences, to perform a search in the order sequence to identify the location at which the sequentially increasing index is stored in the order sequence.

4. The network management device of claim 1, wherein the one or more policy configuration commands include a reorder command that moves at least one policy rule of the plurality of policy rules in the first ordering so as to conform the currently configured policy to the updated policy.

5. The network management device of claim 1, wherein the policy rules include one or more of security rules, device accessibility rules, traffic engineering rules, quality of service rules, network address translation rules, packet filtering rules, packet forwarding rules, and rate limiting rules.

6. The network management device of claim 1, wherein the one or more processors are further configured to present a user interface that enables a user to change the first ordering of the plurality of policy rules to the second ordering.

7. The network management device of claim 1, wherein the one or more processors are further configured to determine whether the conformed currently configured policy satisfies one or more condition requirements of a network managed by the network management device.

8. A method comprising:
storing a currently configured policy for a managed network device and an updated policy for the managed network device, wherein the currently configured policy comprises a plurality of policy rules in a first ordering, and the updated policy comprises the plurality of policy rules in a second ordering;

assigning a sequentially increasing index to each of the plurality of policy rules in the first ordering;

obtaining an order sequence that identifies the plurality of policy rules in the second ordering relative to the sequentially increasing indexes assigned to the plurality of policy rules in the first ordering;

applying a variation of a patience sorting algorithm to the order sequence;

determining, based on the order sequence, a longest increasing subsequence between a source list comprising the plurality of policy rules in the first ordering and a destination list of the plurality of policy rules in the second ordering, wherein the longest increasing subsequence is indicative of a longest subset of the plurality of policy rules that have a same ordering in both the source list and the destination list; and generating, based on the longest increasing subsequence, one or more policy configuration commands for the managed network device that direct the managed network device to conform the currently configured policy to the updated policy; and outputting the one or more policy configuration commands to the managed network device.

9. The method of claim 8,
wherein generating the one or more policy configuration commands comprises:

refraining from generating policy configuration commands with respect to the longest increasing subsequence; and processing each index in the one or more remaining subsequences to generate a policy configuration command to move a policy rule of the plurality of policy rules from the assigned sequentially increasing index to a location at which the assigned sequentially increasing index is stored in the order sequence.

10. The method of claim 9, wherein processing each index in the one or more remaining subsequences comprises performing a search in the order sequence to identify the location at which the sequentially increasing index is stored in the order sequence.

11. The method of claim 8, wherein the one or more policy configuration commands include a reorder command that moves at least one policy rule of the plurality of policy rules in the first ordering so as to conform the currently configured policy to the updated policy.

12. The method of claim 8, wherein the policy rules include one or more of security rules, device accessibility rules, traffic engineering rules, quality of service rules, network address translation rules, packet filtering rules, packet forwarding rules, and rate limiting rules.

13. The method of claim 8, further comprising presenting a user interface that enables a user to change the first ordering of the plurality of policy rules to the second ordering.

14. The method of claim 8, further comprising determining whether the conformed currently configured policy satisfies one or more condition requirements of a network managed by the managed network device.

15. A non-transitory computer-readable storage medium having instructions stored thereon that, when executed, cause one or more processors to:

store a currently configured policy for a managed network device and an updated policy for the managed network device, wherein the currently configured policy comprises a plurality of policy rules in a first ordering, and the updated policy comprises the plurality of policy rules in a second ordering;

assign a sequentially increasing index to each of the plurality of policy rules in the first ordering;

obtain an order sequence that identifies the plurality of policy rules in the second ordering relative to the sequentially increasing indexes assigned to the plurality of policy rules in the first ordering;

apply a variation of a patience sorting algorithm to the order sequence;

determine, based on the order sequence, a longest increasing subsequence between a source list comprising the plurality of policy rules in the first ordering and a destination list of the plurality of policy rules in the second ordering, wherein the longest increasing subsequence is indicative of a longest subset of the plurality of policy rules that have a same ordering in both the source list and the destination list;

generate, based on the longest increasing subsequence, one or more policy configuration commands for the managed network device that direct the managed network device to conform the currently configured policy to the updated policy; and output the one or more policy configuration commands to the managed network device.

16. The non-transitory computer-readable storage medium of claim 15, wherein the instructions stored thereon that, when executed, cause the one or more processors to generate the one or more policy configuration commands comprise instructions stored thereon that, when executed, cause the one or more processors to refrain from generating policy configuration commands with respect to the longest increasing subsequence; and process each index in the one or more remaining subsequences to generate a policy configuration command to move a policy rule of the plurality of policy rules from the assigned sequentially increasing index to a location at which the assigned sequentially increasing index is stored in the order sequence.

17. The non-transitory computer-readable storage medium of claim 16, wherein the instructions stored thereon that, when executed, cause the one or more processors to process each index in the one or more remaining subsequences comprises instructions stored thereon that, when executed, cause the one or more processors to perform a search in the order sequence to identify the location at which the sequentially increasing index is stored in the order sequence.

18. The non-transitory computer-readable storage medium of claim 15, wherein the one or more policy configuration commands include a reorder command that moves at least one policy rule of the plurality of policy rules in the first ordering so as to conform the currently configured policy to the updated policy.

19. The non-transitory computer-readable storage medium of claim 15, wherein the policy rules include one or more of security rules, device accessibility rules, traffic engineering rules, quality of service rules, network address translation rules, packet filtering rules, packet forwarding rules, and rate limiting rules.

20. The non-transitory computer-readable storage medium of claim 15, wherein the instructions stored thereon that, when executed, cause the one or more processors to determine whether the conformed currently configured policy satisfies one or more condition requirements of a network managed by the managed network device.

* * * * *